United States Patent
Kogo

(10) Patent No.: US 9,406,413 B2
(45) Date of Patent: Aug. 2, 2016

(54) FLAME-RETARDANT RESIN COMPOSITION FOR ALUMINUM ELECTRIC WIRE AND ALUMINUM ELECTRIC WIRE USING SAME

(75) Inventor: Kousuke Kogo, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 377 days.

(21) Appl. No.: 13/590,347

(22) Filed: Aug. 21, 2012

(65) Prior Publication Data

US 2012/0312582 A1 Dec. 13, 2012

Related U.S. Application Data

(63) Continuation of application No. PCT/JP2011/055109, filed on Mar. 4, 2011.

(30) Foreign Application Priority Data

Mar. 5, 2010 (JP) .................. 2010-048642

(51) Int. Cl.
*H01B 7/295* (2006.01)
*C08L 23/02* (2006.01)
*C08L 53/02* (2006.01)
(Continued)

(52) U.S. Cl.
CPC .............. *H01B 7/295* (2013.01); *C08L 23/02* (2013.01); *C08L 53/02* (2013.01); *C08K 3/0058* (2013.01); *C08K 3/22* (2013.01); *C08L 51/06* (2013.01); *C08L 2203/20* (2013.01)

(58) Field of Classification Search
CPC ..... C08L 23/02; C08L 53/02; C08L 2203/20; C08L 51/06; C08L 2666/02; C08K 3/0058; C08K 3/22; H01B 7/295

USPC ......... 174/121 A, 126.1, 126.2, 126.4, 128.1, 174/128.2
See application file for complete search history.

(56) References Cited

U.S. PATENT DOCUMENTS 5,561,185 A   10/1996   Hashimoto et al.
5,747,574 A   5/1998   Kanamori
(Continued)

FOREIGN PATENT DOCUMENTS

EP   1100093 A2   5/2001
EP   1 215 238 A1   6/2002
(Continued)

OTHER PUBLICATIONS

Office Action dated Oct. 22, 2013 issued by the Japanese Patent Office in counterpart Japanese Application No. 2012503295.
(Continued)

*Primary Examiner* — Timothy Thompson
*Assistant Examiner* — Paul McGee, III
(74) *Attorney, Agent, or Firm* — Sughrue Mion, PLLC

(57) ABSTRACT

The invention relates to a flame-retardant resin composition for an aluminum electric wire, the resin composition comprising: a base resin containing (A) 75 to 95 parts by weight of a resin composition containing 45 to 65 parts by weight of an olefin-based resin having a tensile modulus of 1000 to 1500 MPa, 10 to 30 parts by weight of an olefin-based resin having a D hardness of 40 to 55, and 5 to 15 parts by weight of a maleic acid-modified resin and (B) 5 to 25 parts by weight of a flexible resin, and (C) 90 to 150 parts by weight of magnesium hydroxide blended into 100 parts by weight of the base resin.

5 Claims, 1 Drawing Sheet

(51) Int. Cl.

| | | |
|---|---|---|
| C08K 3/00 | (2006.01) | |
| C08K 3/22 | (2006.01) | |
| C08L 51/06 | (2006.01) | |

(56) References Cited

U.S. PATENT DOCUMENTS

| | | |
|---|---|---|
| 2003/0207979 A1 | 11/2003 | Sato et al. |
| 2007/0155883 A1 | 7/2007 | Sato et al. |
| 2010/0056691 A1 | 3/2010 | Hoya |
| 2010/0326698 A1 | 12/2010 | Serizawa et al. |

FOREIGN PATENT DOCUMENTS

| | | | |
|---|---|---|---|
| EP | 1 319 686 A2 | | 6/2003 |
| EP | 1 777 261 A1 | | 4/2007 |
| EP | 2 080 784 A1 | | 7/2009 |
| JP | 995570 A | | 4/1997 |
| JP | 10312713 A | | 11/1998 |
| JP | 2001219457 A | | 8/2001 |
| JP | 2001236830 A | | 8/2001 |
| JP | 2002124133 A | | 4/2002 |
| JP | 2002138173 A | | 5/2002 |
| JP | 2002138175 A | | 5/2002 |
| JP | 2004-189792 A | | 7/2004 |
| JP | 2004285185 A | | 10/2004 |
| JP | 200593301 A | | 4/2005 |
| JP | 2005314516 A | | 11/2005 |
| JP | 2005325280 A | | 11/2005 |
| JP | 2006124594 A | | 5/2006 |
| JP | 2006225480 A | | 8/2006 |
| JP | 2006225604 A | | 8/2006 |
| JP | 2007211105 A | | 8/2007 |
| JP | 2007211106 A | * | 8/2007 |
| JP | 2007246572 A | | 9/2007 |
| JP | 2009161703 A | * | 7/2009 |
| JP | 2009301921 A | | 12/2009 |
| WO | 02071563 A1 | | 9/2002 |
| WO | 2009/104539 A1 | | 8/2009 |

OTHER PUBLICATIONS

Selichi Honma, "Plastic Pocket Book", entirely revised edition, Mar. 15, 2003, pp. 120-123.

International Search Report dated May 17, 2011 from the International Searching Authority in counterpart application No. PCT/JP2011/055109.

Written Opinion dated May 17, 2011 from the International Searching Authority in counterpart application No. PCT/JP2011/055109.

Office Action, dated Feb. 8, 2014, issued by the State Intellectual Property Office of P.R. China in counterpart Chinese Patent Application No. 201180012587.2.

Search Report dated Jul. 15, 2014 issued by the European Patent Office in corresponding European Application No. 11750827.5.

"Ethylene Polymers", Encyclopedia of Polymer Science and Engineering, vol. 6, Jan. 1, 1986, pp. 382-522, XP000861836.

Chinese Office Action issued Oct. 11, 2014 by the State Intellectual Property Office of the People's Republic of China in counterpart Chinese Application No. 201180012587.2.

Communication dated Apr. 13, 2015 issued by the State Intellectual Property Office of the People's Republic of China in counterpart Chinese Patent Application No. 201180012587.2.

* cited by examiner

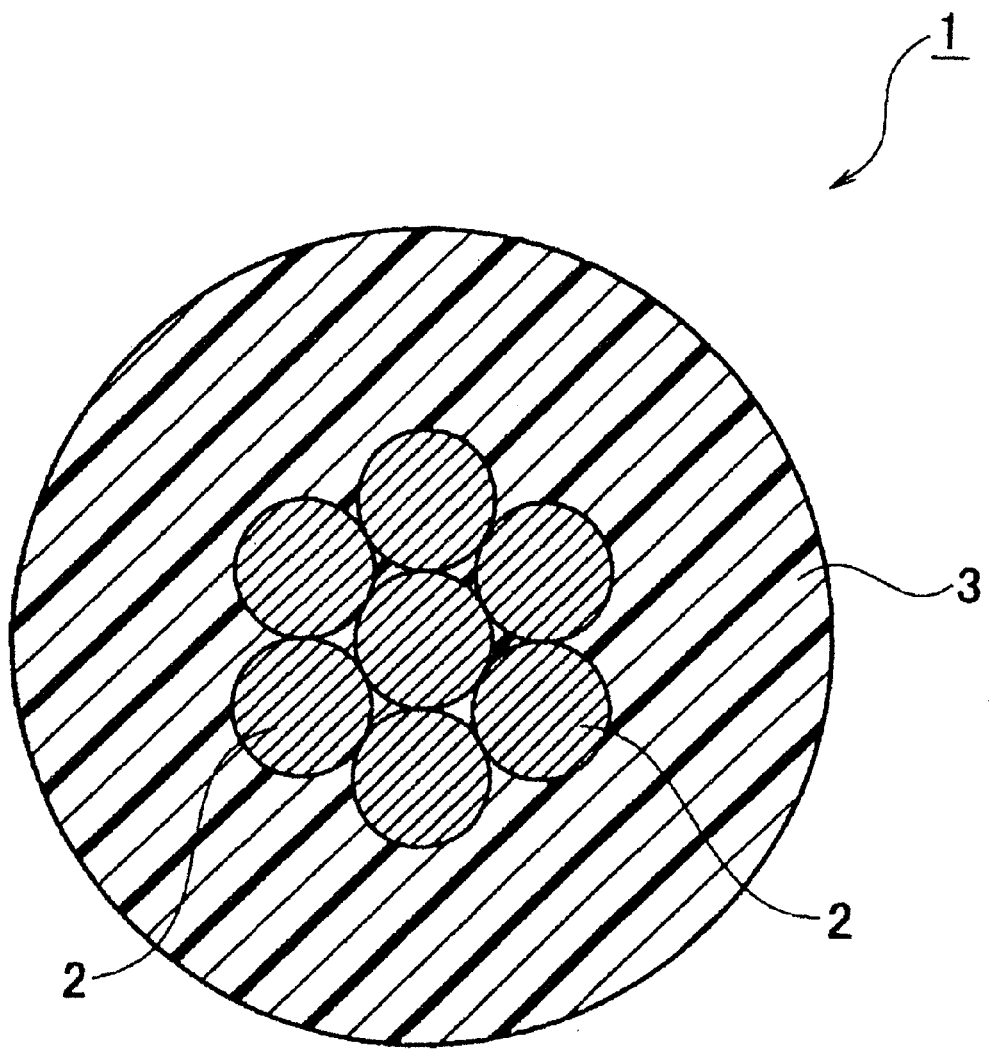

FLAME-RETARDANT RESIN COMPOSITION FOR ALUMINUM ELECTRIC WIRE AND ALUMINUM ELECTRIC WIRE USING SAME

CROSS REFERENCE TO RELATED APPLICATION

This application is a continuation of PCT application No. PCT/JP2011/055109, which was filed on Mar. 4, 2011 based on Japanese Patent Application (No. 2010-048642) filed on Mar. 5, 2010, the contents of which are incorporated herein by reference. Also, all the references cited herein are incorporated as a whole.

BACKGROUND OF THE INVENTION

1. Technical Field

The present invention relates to a flame-retardant resin composition for an aluminum electric wire and an aluminum electric wire using the same.

2. Background Art

As insulator materials for a conventional heat-resistant electric wire for automobiles, there are resin compositions in which a bromine-based flame retardant is added as a flame retardant to an olefin-based resin. In recent years, it has been demanded not to generate a halogen-based gas that causes influence on the human body and corrosion of devices. Therefore, a composition to which magnesium hydroxide is added as a flame retardant instead of the bromine-based flame retardant (a non-halogen composition) has been a main stream.

Moreover, weight saving has been demanded for recent automobile parts and, also as electric wires for automobiles, weight saving has been required. Therefore, there has been proposed an aluminum electric wire in which the conductor is changed from copper (Cu) to aluminum (Al). Since aluminum has a thermal conductivity equal to 60% of that of copper, heat is prone to be accumulated in the inside thereof in the case where aluminum is applied to an electric wire. As a halogen-free insulating material for an insulated electric wire using such aluminum as a conductor, it has been found that, for enhancing flame retardancy, it is best to increase the amount of magnesium hydroxide to be added. In order to dissolve magnesium hydroxide homogeneously in a resin and improve flame retardancy and mechanical properties, there is known a non-halogen flame-retardant resin composition in which a maleic acid-modified resin is blended (for example, see JP-A-2005-314516 and JP-A-2006-225480).

SUMMARY OF THE INVENTION

However, in the present circumstances, there is a problem that flame retardancy cannot be satisfied even when the amount of the maleic acid-modified resin is increased in order to dissolve magnesium hydroxide homogeneously in the resin and improve flame retardancy and mechanical properties.

Accordingly, an object of the present invention is to provide a flame-retardant resin composition for an aluminum electric wire having a high flame retardancy with suppressing a decrease in mechanical properties and an aluminum electric wire using the same.

The gist of the invention lies in the following.

<1> A flame-retardant resin composition for an aluminum electric wire, the resin composition comprising:
  a base resin containing
  (A) 75 to 95 parts by weight of a resin composition containing 45 to 65 parts by weight of an olefin-based resin having a tensile modulus of 1000 to 1500 MPa, 10 to 30 parts by weight of an olefin-based resin having a D hardness of 40 to 55, and 5 to 15 parts by weight of a maleic acid-modified resin and
  (B) 5 to 25 parts by weight of a flexible resin, and
  (C) 90 to 150 parts by weight of magnesium hydroxide blended into 100 parts by weight of the base resin.
<2> The flame-retardant resin composition for an aluminum electric wire according to the above <1>, wherein the flexible resin is a hydrogenated styrene-based thermoplastic elastomer.
<3> An aluminum electric wire comprising an aluminum conductor and an insulating coating layer which is formed of the flame-retardant resin composition for an aluminum electric wire according to the above <1> or <2> and coats the aluminum conductor.

According to the present invention, there can be realized a flame-retardant resin composition for an aluminum electric wire having a high flame retardancy with suppressing a decrease in mechanical properties and an aluminum electric wire. Specifically, there can be realized an aluminum electric wire which put flame out within 70 seconds in a 45° incline flame retardancy test in ISO 6722 (2006) and having an insulator tensile elongation at break of 200% or more and a flexibility of 2.0 N or less.

BRIEF DESCRIPTION OF THE DRAWING

FIG. 1 is a cross-sectional view showing an aluminum electric wire 1 according to an embodiment of the invention.

DETAILED DESCRIPTION OF THE EXEMPLARY EMBODIMENTS

The following will explain the flame-retardant resin composition for an aluminum electric wire and the aluminum electric wire according to an embodiment of the present invention.

In the Description, "% by weight" and "part(s) by weight" have the same meanings as "% by mass" and "part(s) by mass", respectively.

In the invention, halogen-free or non-halogen means that any halogen compound is not contained as an effective component for exhibiting various functions such as flame retardancy in the resin composition and does not mean that halogens slightly contained unavoidably as impurities or the like are also not contained.

[Flame-Retardant Resin Composition for Aluminum Electric Wire]

The flame-retardant resin composition for an aluminum electric wire according to the embodiment of the invention is a non-crosslinkable resin composition comprising a base resin containing (A) 75 to 95 parts by weight of a resin composition containing an olefin-based resin and a maleic acid-modified resin and (B) 5 to 25 parts by weight of a flexible resin, and (C) 90 to 150 parts by weight of magnesium hydroxide blended into 100 parts by weight of the base resin.

The olefin-based resin is preferably composed of two or more of known propylene (co)polymers such as block copolymers or random copolymers containing propylene as a main component with the other α-olefin, including propylene-ethylene random copolymer propylene-α-olefin random copolymers, propylene-ethylene-α-olefin random copolymers, and the like. Of these, the composition having the above content comprises a: 45 to 85 parts by weight of an olefin-based resin having a tensile modulus of 1000 to 1500 MPa measured in accordance with JIS K7161 (1993) as one resin and b: 10 to 30 parts by weight of an olefin-based resin having a D hardness of 40 to 55 measured in accordance with JIS K7215 (1986) as one resin. In this regard, when the content of the olefin-based resin having a D hardness of 40 to 55 exceeds the above range, abrasion resistance decreases and when the content is less than the above range, flexibility is lost. A preferable content of the olefin-based resin having a D hardness of 40 to 55 is 10 to 20 parts by weight. In the invention, an ethylene-vinyl acetate copolymer and/or an ethylene-(meth)acrylate ester copolymer are not contained as the olefin-based resins. This is because these resins are very soft and thus abrasion resistance is deteriorated when they are blended.

The maleic acid-modified resin to be used in the invention is a resin obtained by graft polymerization of maleic anhydride to a polypropylene-based resin. The maleic acid-modified resin may be manufactured by either manufacturing method of a melt process or a solution process. In this regard, a degree of modification is preferably 0.5 to 6.0 wt %, more preferably 2 to 3 wt %.

The content of the maleic acid-modified resin is 5 to 15 parts by weight, preferably 5 to 10 parts by weight. When the content of the maleic acid-modified resin is less than the above lower limit, the abrasion resistance decreases. When the mixing amount exceeds the upper limit, the flame retardancy decreases.

As the flexible resin, a hydrogenated styrene-based thermoplastic elastomer (SEBS) is used. The hydrogenated styrene-based thermoplastic elastomer is a polymer obtained by hydrogenating the double bond of a block copolymer of styrene and butadiene and is excellent in thermal aging resistance and weather resistance. In the present embodiment, as the flexible resin, there is used a resin having a melt flow rate (MFR), which is an index of fluidity of a synthetic resin, at 230° C. and 2.16 kg of 4.5 g/10 minutes or less. When the flexible resin is blended in an amount of less than 6 parts by weight, the flame retardancy, elongation rate, and flexibility of the flame retardant resin composition for an aluminum electric wire decrease, so that the case is not preferred. When the content of the flexible resin is more than 25 parts by weight, the abrasion resistance decreases, so that the case is not preferred. A preferable content of the flexible resin is 10 to 15 parts by weight.

When the content of magnesium hydroxide is less than 90 parts by weight, the flame retardancy of the flame retardant resin composition for an aluminum electric wire decreases, so that the case is not preferred. Moreover, when the content of magnesium hydroxide exceeds 150 parts by weight, the elongation rate, flexibility, and abrasion resistance of the flame retardant resin composition for an aluminum electric wire decrease, so that the case is not preferred. In this regard, a preferable content of magnesium hydroxide is 90 to 120 parts by weight.

In the invention, in addition to the above essential components, a flame retardant, a flame retardant aid, an antioxidant, a metal deactivator, other age resisters, a lubricant, a filler and a reinforcing agent, a UV absorbent, a stabilizer, a plasticizer, a pigment, a dye, a coloring agent, an antistatic agent, a foaming agent, and the like may be blended in the ranges where the advantage of the invention is not inhibited.

[Aluminum Electric Wire]

FIG. 1 is a cross-sectional view showing an aluminum electric wire according to an embodiment of the invention. As shown in FIG. 1, the aluminum electric wire 1 is constituted by coating a bundle of plural aluminum electric wires 2 with an insulating coating 3 composed of the above flame retardant resin composition for an aluminum electric wire. In this regard, the insulating coating 3 is not subjected to a crosslinking treatment after an extrusion step is performed. Since such an aluminum electric wire 1 is coated with the flame retardant resin composition having a high flame retardancy and having high mechanical properties such as abrasion resistance, the electric wire is highly reliable even in the case where it is used as an electric wire for an automobile.

Particularly, the aluminum electric wire 1 of the invention can realize an aluminum electric wire which can put flame out within 70 seconds in a 45° incline flame retardancy test in ISO 6722 (2007) and which has an insulator tensile elongation at break of 200% or more and a flexibility of 2.0 N or less.

The aluminum electric wire 1 according to the present embodiment can suppress a decrease in mechanical properties such as flexibility and thermal resistance at the use in an engine room and also make it possible to suppress the amount of a flame retardant.

EXAMPLES

The following will specifically explain Examples of the invention, Comparative Examples, and Conventional Examples.

(Blending Resins and Blending Materials used in Examples, Comparative Examples, and Conventional Examples)

Olefin-based resin a: trade name PB170A (manufactured by SunAllomer Ltd.) (tensile strength: 1050 MPa)

Olefin-based resin b: trade name TAFMER XM5070 (manufactured by Mitsui Chemicals, Inc.) (D hardness: 52)

Maleic acid-modified resin: trade name U-mex 1001 (manufactured by Sanyo Chemical Industries, Ltd.)

Flexible resin (SEBS): trade name TUFTEC H1062 (manufactured by Asahi Kasei Corporation)

Magnesium hydroxide: trade name KISUMA 5A (manufactured by Kyowa Chemical Industry Co., Ltd.)

(Concerning Judgment Criteria)

Flame Retardancy

A sample of an insulated electric wire having a length of 600 mm or more was fixed in a calm tank at an incline of 45°. After reducing flame of a Bunsen burner was applied vertically to the electric wire in a portion 500 mm±5 mm apart from the upper end for 15 seconds, the sample which put the flame out within 70 seconds was evaluated as qualified (O) and the sample which took a time exceeding 70 seconds was evaluated as disqualified (X).

Tensile Elongation at Break

It was conducted in accordance with JIS B 7721 (1993). An insulated electric wire was cut out in a length of 150 mm and was transformed into a tubular test piece of a coating layer alone by removing the conductor. Thereafter, marked lines were put at an interval of 50 mm at the central portion. Then, after both ends of the test piece were fixed to chucks of a tensile tester at room temperature, it was drawn at a drawing rate of 25 to 500 mm/minute and distance between the marked lines was measured. The case where elongation was 500% or more was evaluated to be qualified (O) and the case where elongation was less than 500% was evaluated to be disqualified (X).

Abrasion Resistance Test (load: 7N)

It was conducted using a scrape abrasion testing machine. Namely, an insulated electric wire having a length of about 1 m was placed on a sample holder and was fixed with a clamp. Then, a plunge having a piano wire having a diameter of 0.45 mm at the tip was applied to the insulated electric wire under a total load of 7N using a pressurizing member and was reciprocated (reciprocation distance: 14 mm). The number of reciprocation times until the piano wire of the plunge touched the conductor of the insulated electric wire due to abrasion of the coating layer of the insulated electric wire was counted. When the number of times was 300 or more, it was evaluated to be qualified (O) and, when the number was less than 300, it was evaluated to be disqualified (X).

Flexibility Test

An insulated electric wire sample cut out in a length of 100 mm was placed on a frame fitted with rollers mutually apart at a distance of 60 mm, and a force gauge was pressed on a middle part of the electric wire placed on the rollers at a rate of 100 mm/minute. A maximum load was measured when the electric wire was bent and dropped.

Tables 1 to 3 show Blend Examples (unit: part by weight) of Examples and Comparative Examples and test results thereof.

What is claimed is:

1. A flame-retardant resin composition for an aluminum electric wire, the resin composition comprising:
    a base resin containing
        (A) 75 to 95 parts by weight of a resin composition containing 45 to 65 parts by weight of an olefin-based resin having a tensile modulus of 1000 to 1500 MPa, 10 to 30 parts by weight of an olefin-based resin having a D hardness of 40 to 55, and 5 to 15 parts by weight of a maleic acid-modified resin and
        (B) 5 to 25 parts by weight of a flexible resin, which is a hydrogenated styrene-based thermoplastic elastomer, and
        (C) 90 to 150 parts by weight of magnesium hydroxide blended into 100 parts by weight of the base resin,
    wherein the flexible resin has a melt flow rate at 230° C. and 2.16 kg of 4.5 g per 10 minutes or less.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Olefin-based | a | 45 | 55 | 65 | 55 | 55 | 55 | 65 | 55 | 55 |
| resin | b | 30 | 20 | 10 | 20 | 20 | 20 | 20 | 20 | 10 |
| Maleic acid-modified resin | | 15 | 15 | 15 | 15 | 10 | 5 | 10 | 10 | 10 |
| Flexible resin | | 10 | 10 | 10 | 10 | 15 | 20 | 5 | 15 | 25 |
| Magnesium hydroxide | | 90 | 90 | 90 | 90 | 90 | 90 | 90 | 90 | 90 |
| Flame retardancy | | O | O | O | O | O | O | O | O | O |
| Tensile elongation at break | | O | O | O | O | O | O | O | O | O |
| Flexibility | | O | O | O | O | O | O | O | O | O |
| Abrasion resistance | | O | O | O | O | O | O | O | O | O |

TABLE 2

|  |  | Example 10 | Example 11 | Example 12 | Example 13 | Example 14 | Example 15 | Example 16 | Example 17 | Example 18 |
|---|---|---|---|---|---|---|---|---|---|---|
| Olefin-based | a | 45 | 55 | 65 | 55 | 55 | 55 | 65 | 55 | 55 |
| resin | b | 30 | 20 | 10 | 20 | 20 | 20 | 20 | 20 | 10 |
| Maleic acid-modified resin | | 15 | 15 | 15 | 15 | 10 | 5 | 10 | 10 | 10 |
| Flexible resin | | 10 | 10 | 10 | 10 | 15 | 20 | 5 | 15 | 25 |
| Magnesium hydroxide | | 150 | 150 | 150 | 150 | 150 | 150 | 150 | 150 | 150 |
| Flame retardancy | | O | O | O | O | O | O | O | O | O |
| Tensile elongation at break | | O | O | O | O | O | O | O | O | O |
| Flexibility | | O | O | O | O | O | O | O | O | O |
| Abrasion resistance | | O | O | O | O | O | O | O | O | O |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Olefin-based | a | 60 | 38 | 60 | 55 | 65 | 50 | 55 | 55 |
| resin | b | 9 | 31 | 21 | 14 | 20 | 14 | 20 | 20 |
| Maleic acid-modified resin | | 15 | 15 | 4 | 16 | 10 | 10 | 15 | 15 |
| Flexible resin | | 16 | 16 | 15 | 15 | 4 | 26 | 10 | 10 |
| Magnesium hydroxide | | 100 | 100 | 100 | 100 | 1000 | 100 | 85 | 155 |
| Flame retardancy | | O | O | O | X | X | O | X | O |
| Tensile elongation at break | | O | O | X | O | X | O | O | X |
| Flexibility | | X | O | O | O | X | O | O | X |
| Abrasion resistance | | O | X | O | O | O | X | O | X |

While the invention has been described in detail and with reference to specific embodiments thereof, it will be apparent to one skilled in the art that various changes and modifications can be made therein without departing from the spirit and scope thereof.

2. An aluminum electric wire comprising an aluminum conductor and an insulating coating layer which is formed of the flame-retardant resin composition for an aluminum electric wire according to claim 1 and coats the aluminum conductor.

3. The flame-retardant resin composition for an aluminum electric wire according to claim 1, wherein the 5 to 15 parts by weight of a maleic acid-modified resin comprise 0.5 to 6.0 wt % of the base resin.

4. The flame-retardant resin composition for an aluminum electric wire according to claim 1, wherein the 5 to 15 parts by weight of a maleic acid-modified resin comprise 2 to 3 wt % of the base resin.

5. The flame-retardant resin composition for an aluminum electric wire according to claim 1, wherein the resin composition does not comprise either of an ethylene-vinyl acetate copolymer or an ethylene-(meth)acrylate ester copolymer.

* * * * *